United States Patent [19]
Adam

[11] Patent Number: 6,162,767
[45] Date of Patent: *Dec. 19, 2000

[54] COMPOSITE BEARING WITH IRON OXIDE ADDITIVE

[75] Inventor: Achim Adam, Nauheim, Germany

[73] Assignee: Glyco-Metall-Werke Glyco B.V. & Co. KG, Weisbaden, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/973,817

[22] PCT Filed: Mar. 21, 1997

[86] PCT No.: PCT/DE97/00590

§ 371 Date: Dec. 9, 1997

§ 102(e) Date: Dec. 9, 1997

[87] PCT Pub. No.: WO97/38046

PCT Pub. Date: Oct. 16, 1997

[30] Foreign Application Priority Data

Apr. 10, 1996 [DE] Germany .......... 196 14 105

[51] Int. Cl.[7] .............. F16C 17/12; F16C 29/02

[52] U.S. Cl. .......... 508/106; 508/104; 508/105; 508/108

[58] Field of Search .......... 508/104, 105, 508/106, 108

[56] References Cited

U.S. PATENT DOCUMENTS

| | | | |
|---|---|---|---|
| 3,896,036 | 7/1975 | Cairns | 508/104 |
| 4,000,982 | 1/1977 | Ueda | 508/104 |
| 4,115,283 | 9/1978 | Needham | 508/107 |
| 4,312,772 | 1/1982 | Mori | 508/104 |
| 4,626,365 | 12/1986 | Mori | 508/106 |
| 4,812,367 | 3/1989 | Bickle | 508/106 |
| 5,091,098 | 2/1992 | Tanaka et al. | 508/104 |

*Primary Examiner*—Jerry D. Johnson
*Attorney, Agent, or Firm*—Reising, Ethington, Barnes, Kisselle, Learman & McCulloch, P.C.

[57] ABSTRACT

Iron oxide functions as a wear- and cavitation-inhibiting additive in the plastic sliding layer(s) of composite bearings for oil-lubricated applications. The sliding layers predominantly consist of thermoplastic fluoropolymers. The addition of iron oxide to PTFE-based materials reduces the destruction of the sliding surface owing to the appearance of cavitation if the materials are used in the presence of oil.

9 Claims, No Drawings

COMPOSITE BEARING WITH IRON OXIDE ADDITIVE

BACKGROUND OF THE INVENTION

1. Field of the Invention

The invention relates to the improvement of the resistance to wear and cavitation exhibited by plastics overlays on composite materials used as bearings for oil-lubricated applications. In particular, the invention provides an increase in the service life of shock absorbers and composite bearings used under shock absorber-type conditions.

2. Description of Related Art

Materials used for composite bearings with plastics overlays consist of a metallic backing layer, preferably of steel, bronze or a high-strength aluminum alloy, and a sealed plastics overlay applied directly to the metal backing. As an alternative to this, the plastics overlay may also be applied to a porous intermediate layer of sintered metal, in such a way that the pores are also completely filled with plastics material. The plastics overlay comprises PTFE as its base material and additionally contains wear- and friction-reducing additives.

For bearing systems such as these where oil is present, a very low coefficient of friction accompanied at the same time by a high degree of resistance to wear and cavitation is very important, for example in shock absorbers which are used in the automobile industry or in gear pumps or hydraulic motors. Owing to the low coefficients of friction necessary, current knowledge insists that such materials consist to a considerable extent of PTFE, since no other known plastics satisfy these requirements, even when their other properties are suitable.

Since PTFE alone is too soft, and therefore has a high coefficient of wear, materials must be mixed with it which counter cavitation and wear without substantially increasing the coefficient of friction.

The bearing materials used most commonly at present in the above-mentioned area of application consist of a steel backing, a porous bronze layer and a plastics material of which approximately 80 vol. % is PTFE and the rest is lead or molybdenum disulphide. The plastics material is pressed into the bronze framework and forms a thin sealed layer thereover. However, materials with this structure have a tendency to produce erosion and cavitation phenomena under extreme conditions, such as arise in shock absorbers for example through heavy loads, high sliding speeds and acceleration rates and high flow speeds in the bearing gap, and therefore have only a limited service life, especially when highly stressed.

Although it is possible to produce materials which exhibit hardly any wear and no susceptibility to cavitation under the above-described conditions if a thermoplastic material other than PTFE is used, for instance PVDF or PEEK, a marked increase in friction in the case of oil lubrication has in such cases to be accepted.

Many documents propose PTFE-based compositions which, however, have hitherto provided relatively only slight improvements over the above-mentioned standard materials and generally have an increased coefficient of friction, as in the case of calcium fluoride, put forward in EP 183375 A2, or of polyimides, as proposed in DE 4227909 C2.

WO 95/02772 proposes the use of an aramide fibre pulp to reduce wear and cavitation, but the homogeneous mixing-in of these fibres causes problems and requires appropriate additional production equipment.

In contrast thereto, it is the object of this invention to make it possible, without altering production processes and without impairment of the coefficient of friction when oil is used, to achieve service lives which surpass several times those of the corresponding materials according to the prior art.

SUMMARY OF THE INVENTION

In particular, the use of iron oxide as a wear- and cavitation-inhibiting additive in plastics overlays, consisting predominantly of thermoplastic fluoropolymers, of composite bearings for oil-lubricated applications makes it possible markedly to increase the service lives of these composite bearings for oil-lubricated applications without any disadvantageous effect on the extraordinarily low coefficient of friction of the plastics overlays when oil is used.

DETAILED DESCRIPTION OF THE PREFERRED EMBODIMENTS

It is sufficient, in the context of the invention, to add a small amount of iron oxide to the otherwise conventional standard compositions of plastics overlays for composite materials.

Although mention is frequently made of the possibility of using iron oxide as a filler in self-lubricating PTFE-based bearing materials, as in DE 4105657 C2 for example, it is used only as a "neutral element" and may be replaced by other oxides or oxide combinations, rather than being absolutely essential for the achievement of a specific property. Furthermore, in the above patent the presence of a meltable fluorothermoplastics material is given as an additional prerequisite.

In JP 04114094 A2, the addition to PTFE of iron oxide together with glass fibres is recommended for sliding elements in contact with foodstuffs. This is not relevant to the above-described instances of use, since hard material particles such even as glass have an undesirably abrasive effect and over time impair the function of the components in such cases while resulting additionally in a high coefficient of friction.

It has surprisingly been found that, when iron oxide is added to PTFE-based materials, fatigue cracking of the sliding surface owing to cavitation phenomena is greatly decreased. On the other hand, when used in the absence of lubricants, the materials with added iron oxide come off less well than the corresponding iron oxide-free compositions. A link between the durability of plain bearing materials under the above-mentioned conditions and the addition of iron oxide had never previously been established.

In an advantageous embodiment of the invention, use is made of the following in the production of plastics overlays for oil-lubricated composite bearings:

(i) 0.5–10 vol. % iron oxide in a plastics overlay which additionally comprises (ii) 55–90 vol. % of one or more thermoplastic fluoroplastics and (iii) 9.5–44.5 vol. % of lead, lead oxide, metal sulphides with a lamellar structure, metal fluorides, boron nitride, graphite, carbon black or coke, separately or in combination, wherein (i), (ii) and (iii) are so selected that together they add up to 100 vol. %, wherein the plastics overlay (iv) may contain conventional additives which make up the residual amount if (i)+(ii)+(iii) adds up to less than 100 vol. %.

Consequently, a plastics material for use in the context of the invention as a plastics overlay is basically composed of 55 to 90 vol. % PTFE, with which are mixed, separately or in combination, 9.5–44.5 vol. % of the known fillers lead, lead oxide, metal sulphides with a lamellar structure such as molybdenum sulphide, metal fluorides, boron nitride or graphite, carbon black, coke, wherein the plastics composition further contains 0.5–10 vol. % iron oxide.

The preferred form of iron oxide used is $Fe_2O_3$. The plastics material of the overlay advantageously consists predominantly of PTFE.

Parts of the PTFE may also be replaced by parts of other fluorothermoplastics. Fluorothermoplastics which may be used within the context of the invention comprise, inter alia, homopolymers such as PCTFE (polychlorotrifluoroethylene), PVDF (polyvinylidene fluoride), PVF (polyvinyl fluoride), alternating copolymers such as ETFE (polyethylene-tetrafluoroethylene alternating copolymer), CM-1 (polyvinylidene-hexafluoropropylene alternating copolymer) and/or random copolymers such as FEP (polytetrafluoroethylene-hexafluoropropylene copolymer) and PFA (copolymer of tetrafluoroethylene and perfluorovinylalkylether). The use of other additives such as fibres, plastics, hard materials, dyes etc is also possible within the context of the above-mentioned proportions.

In a particularly advantageous modification, a material is used as the overlay which is obtained if (i) 1–6 vol. % $Fe_2O_3$, (ii) 65–75 vol. % PTFE and (iii) 24–34 vol. % lead, lead oxide, molybdenum disulphide, metal fluorides, boron nitride, graphite, carbon black or coke, separately or in combination, are used, wherein (i)+(ii)+(iii) amount to up to 100 vol. % and, if (i)+(ii)+(iii) add up to less than 100 vol. %, (iv) fibres, plastics, hard materials and/or dyes are optionally additionally contained in the plastics overlay to make up the residual amount.

This results in an overlay with particularly advantageous properties.

$Fe_2O_3$ is best used in its red and/or brown α-form.

It is also preferable, within the context of the invention, to use $Fe_2O_3$ in the form of spherical primary grains with an average particle size of $\leq 5$ μm.

The use of $Fe_2O_3$ with particle sizes $\leq 5$ μm is particularly advantageous.

Particularly good results are achieved with $Fe_2O_3$ using filler combinations consisting of metal sulphides with a lamellar structure and hexagonal boron nitride.

By way of example, three possible embodiments are compared with the corresponding materials without added $Fe_2O_3$. The compositions are given in Table 1.

TABLE 1

| Example No. | Composition in Vol. % | |
|---|---|---|
| 1 | PTFE | 70 |
|   | $MoS_2$ | 27 |
|   | $Fe_2O_3$ | 3 |
| 2 | PTFE | 70 |
|   | $MoS_2$ | 30 |
| 3 | PTFE | 70 |
|   | Graphite | 27 |
|   | $Fe_2O_3$ | 3 |
| 4 | PTFE | 70 |
|   | Graphite | 30 |
| 5 | PTFE | 70 |
|   | BN | 13.5 |

TABLE 1-continued

| Example No. | Composition in Vol. % | |
|---|---|---|
|   | $MoS_2$ | 13.5 |
|   | $Fe_2O_3$ | 3 |
| 6 | PTFE | 70 |
|   | BN | 15 |
|   | $MoS_2$ | 15 |

The production of samples may be carried out in a known way:
homogeneous suspension of the fillers and the iron oxide in water by means of a non-ionic wetting agent;
addition of a 30% PTFE dispersion and homogeneous mixing;
achievement of coagulation of the mixture by means of aluminium nitrate solution;
removal of excess water and stirring until the composition is of a coating consistency;
rolling of the mixture into the porous bronze framework applied to steel;
sintering of the PTFE at 380° C.;
hot compression of the overall structure by rolling.

Bushings of these materials were subjected to a shock absorber test, during which the service life under particularly cavitation- and wear-promoting conditions was determined. The test was carried out on bushings with a running surface width of 10 mm in twin-tube dampers with a rod diameter of 22 mm under a constant lateral load of 2000 N. Ramp-shaped and sinusoidal movements each of 0.5 Hz and with a peak-to-peak amplitude of 80 mm were effected alternately for periods of 20 seconds, until the destruction of the overlay owing to leakage of the damper became apparent. The tests were broken off after a maximum of 120 hours, however.

Furthermore, the coefficients of friction of the materials in the bushing/rod system under drip-feed lubrication were measured under a specific load of 3 MPa and at a sliding speed of 0.01 m/s.

The data are assembled in Tab. 2.

TABLE 2

| Example No. | Service life in cavitation test [h] | Coefficient of friction, oiled |
|---|---|---|
| 1 | 85 | 0.022 |
| 2 | 37 | 0.020 |
| 3 | 17 | 0.038 |
| 4 | 5 | 0.034 |
| 5 | >120 (test broken off) | 0.016 |
| 6 | 33 | 0 017 |

These results show just how great is the positive influence of the iron oxide on the wear- and cavitation-resistance and that the coefficient of friction is barely influenced thereby.

What is claimed is:

1. A composite bearing comprising:
a metallic backing layer; and
a lead-free overlay applied to said backing layer having a thermoplastic fluoropolymer matrix consisting of PTFE and including metallic oxide wear and cavitation-inhibiting particles dispersed in said matrix consisting of iron oxide particles.

2. A bearing according to claim 1, wherein said iron oxide comprises $Fe_2O_3$.

3. A bearing according to claim 2, wherein said $Fe_2O_3$ iron oxide particles comprise at least one of the red and brown α-forms.

4. A bearing according to claim 1, wherein said iron oxide particles are in the form of spherical primary grains with an average particle size $\leq 5$ μm.

5. A bearing according to claim 1, wherein said iron oxide particles have an average particle size $\leq 5$ μm.

6. A bearing according to claim 1, wherein said metallic backing layer comprises a steel backing and a layer of porous sintered bearing metal applied to said steel backing.

7. A bearing according to claim 1 wherein said PTFE matrix is present in the amount of 55–90 vol. % and said iron oxide particles are present in the amount of 0.5–10 vol. %.

8. A bearing according to claim 7 wherein said overlay includes at least one additive material selected from the group consisting of lamellar metal sulfide, metal fluoride, boron nitrate, graphite, carbon black, and coke present in the amount of 9.5 to 44.5 vol. %.

9. A composite bearing comprising:

a steel backing;

a porous sintered functional layer of bearing metal applied to said backing; and a lead-free overlay applied to said functional layer having a thermoplastic fluoropolymer matrix consisting of PTFE present in an amount of between 55–90 vol. %, and metal oxide wear and cavitation-inhibiting particles dispersed in said PTFE matrix consisting of $Fe_2O_3$ present in at least one of the red and brown α-forms in an amount of between 0.5–10 vol. %.

* * * * *